US012654189B2

(12) United States Patent
Alluigi

(10) Patent No.: US 12,654,189 B2
(45) Date of Patent: Jun. 16, 2026

(54) TRIGGER DISPENSING DEVICE WITH VALVE MEANS

(71) Applicant: GUALA DISPENSING S.P.A., Alessandria (IT)

(72) Inventor: Riccardo Alluigi, Alessandria (IT)

(73) Assignee: GUALA DISPENSING S.P.A., Alessandria (IT)

( * ) Notice: Subject to any disclaimer, the term of this patent is extended or adjusted under 35 U.S.C. 154(b) by 283 days.

(21) Appl. No.: 18/261,320

(22) PCT Filed: Feb. 17, 2022

(86) PCT No.: PCT/IB2022/051423

§ 371 (c)(1),
(2) Date: Jul. 13, 2023

(87) PCT Pub. No.: WO2022/175867

PCT Pub. Date: Aug. 25, 2022

(65) Prior Publication Data

US 2024/0075488 A1 Mar. 7, 2024

(30) Foreign Application Priority Data

Feb. 18, 2021 (IT) ........................ 102021000003749

(51) Int. Cl.
*B05B 11/10* (2023.01)

(52) U.S. Cl.
CPC ....... *B05B 11/1069* (2023.01); *B05B 11/1011* (2023.01)

(58) Field of Classification Search
CPC ......................... B05B 11/1069; B05B 11/1011
USPC ........................................................ 239/526
See application file for complete search history.

(56) References Cited

U.S. PATENT DOCUMENTS 4,971,227 A * 11/1990 Knickerbocker ... B05B 11/1011 222/153.07
6,869,027 B2 * 3/2005 Foster ................. B05B 11/1011 239/398
9,307,871 B2 * 4/2016 McNulty .................. A47K 5/14
9,962,724 B2 * 5/2018 Fujiwara ............. B05B 11/1002
11,596,960 B2 * 3/2023 Sweeton ............. B05B 11/1069
2017/0176177 A1 * 6/2017 Takesue ............. G01B 9/02097

FOREIGN PATENT DOCUMENTS

JP H10174913 A 6/1998
JP 2004314016 A 11/2004
WO 2014016709 A1 1/2014

OTHER PUBLICATIONS

CN111924318A English by Google Patents (Year: 2020).*
International Search Report for International Patent Application No. PCT/IB2022/051423, mailed May 16, 2022.

* cited by examiner

*Primary Examiner* — Chee-Chong Lee
(74) *Attorney, Agent, or Firm* — Armstrong Teasdale LLP

(57) ABSTRACT

A trigger dispensing head of a trigger dispensing device is provided. The trigger dispensing head has a cylinder chamber, a piston, a pressure chamber, a sleeve having an end wall, a suction duct terminating in a suction mouth, a dispensing duct, and valve members for regulating flow of a product. The valve members have a valve element made in one piece. The valve element has a tubular portion, a flexible flap, and an annular membrane.

10 Claims, 14 Drawing Sheets

TRIGGER DISPENSING DEVICE WITH VALVE MEANS

CROSS-REFERENCE TO RELATED APPLICATIONS

This application is a National Stage Application of International Patent Application No. PCT/IB2022/051423, having an International Filing Date of Feb. 17, 2022, which claims priority to Italian Application No. 102021000003749, filed Feb. 18, 2021, the entire contents of which are hereby incorporated by reference herein.

FIELD OF THE INVENTION

This invention is in the field of trigger dispensing devices, typically used for dispensing liquid products for household hygiene, personal care, and countless other purposes. In particular, the subject of this invention is a trigger dispensing head applicable to a bottle, provided with integrated suction and pre-compression valve means.

BACKGROUND OF THE INVENTION

Trigger dispensing devices are enormously popular today; several hundred million units are manufactured and sold each year.

For proper functionality, these devices provide valve means that regulate the flow of product from the bottle to a pressure chamber (suction phase) and from the pressure chamber to the external environment (dispensing phase).

In order to obtain a spray pattern with optimal features for the use of the product, e.g., uniformity of droplets, shape and size of the spray pattern, persistence of the product in air or on a surface, many solutions for dispensing devices provide pre-compression valves, which allow the product to escape from the pressure chamber to the external environment only when the pressure in the pressure chamber exceeds a predefined threshold value.

Given the high production volumes, the research and development efforts of manufacturing companies have focused on identifying solutions that meet the aforesaid requirements and facilitate the industrial processes of component production, device assembly, etc.

Some solutions, for example, involve suction valve means and pre-compression valve means integrated into a single valve element. For example, one solution is outlined in the International Application WO-A1-2014/016709, in the name of the Applicant.

OBJECT OF THE INVENTION

The object of this invention is to provide a trigger dispensing device with integrated valve means that are able to facilitate the manufacturing and assembly process.

This object is achieved by a dispensing head as described and claimed herein. Advantageous embodiments of the present invention are also described.

BRIEF DESCRIPTION OF THE DRAWINGS

The features and advantages of the dispensing head according to this invention will be apparent from the description provided below, given by way of non-limiting example according to the figures in the appended drawings, wherein.

DETAILED DESCRIPTION

Figure 1:
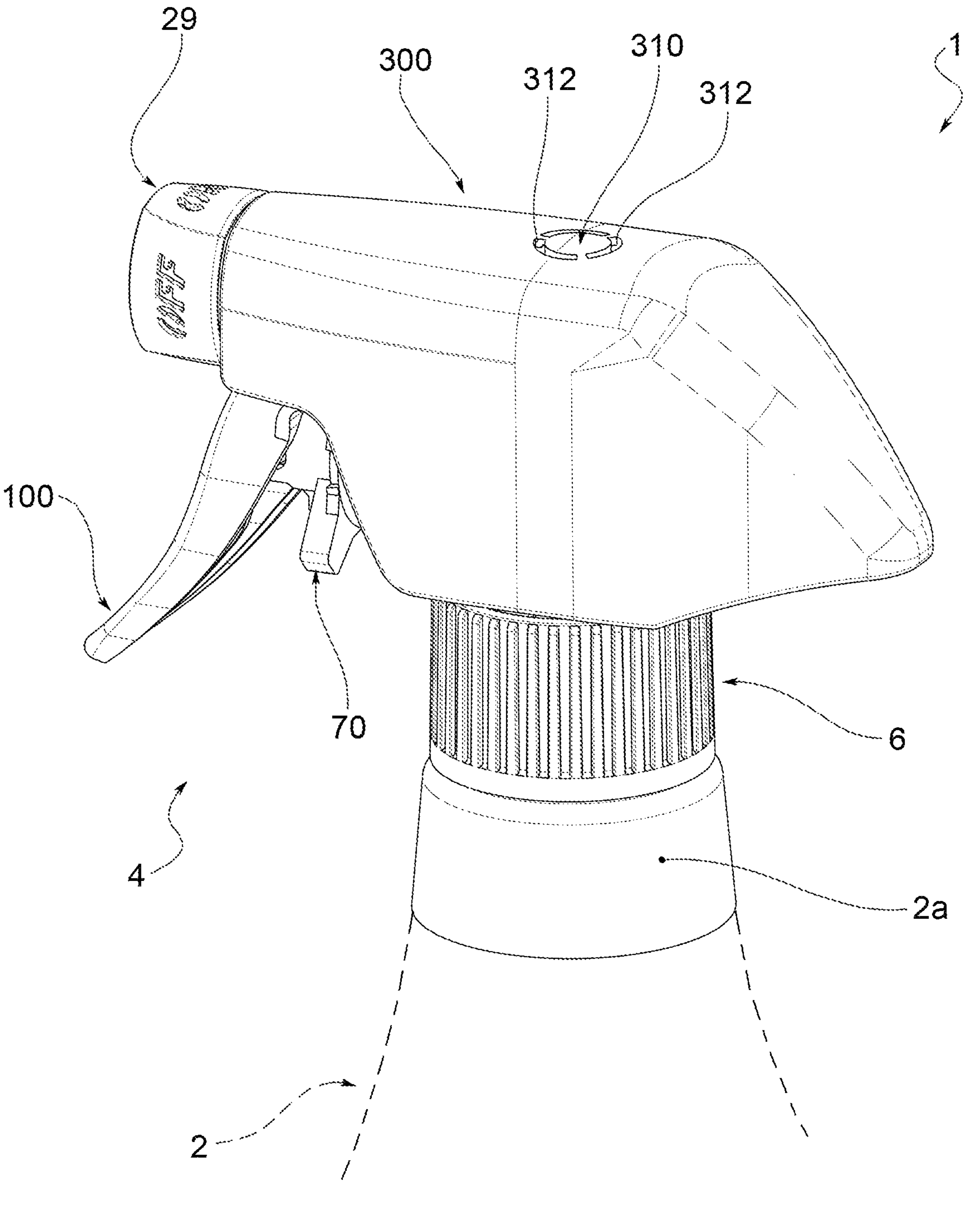
FIG. 1 depicts a trigger dispensing device according to an embodiment of this invention.
Figure 2:
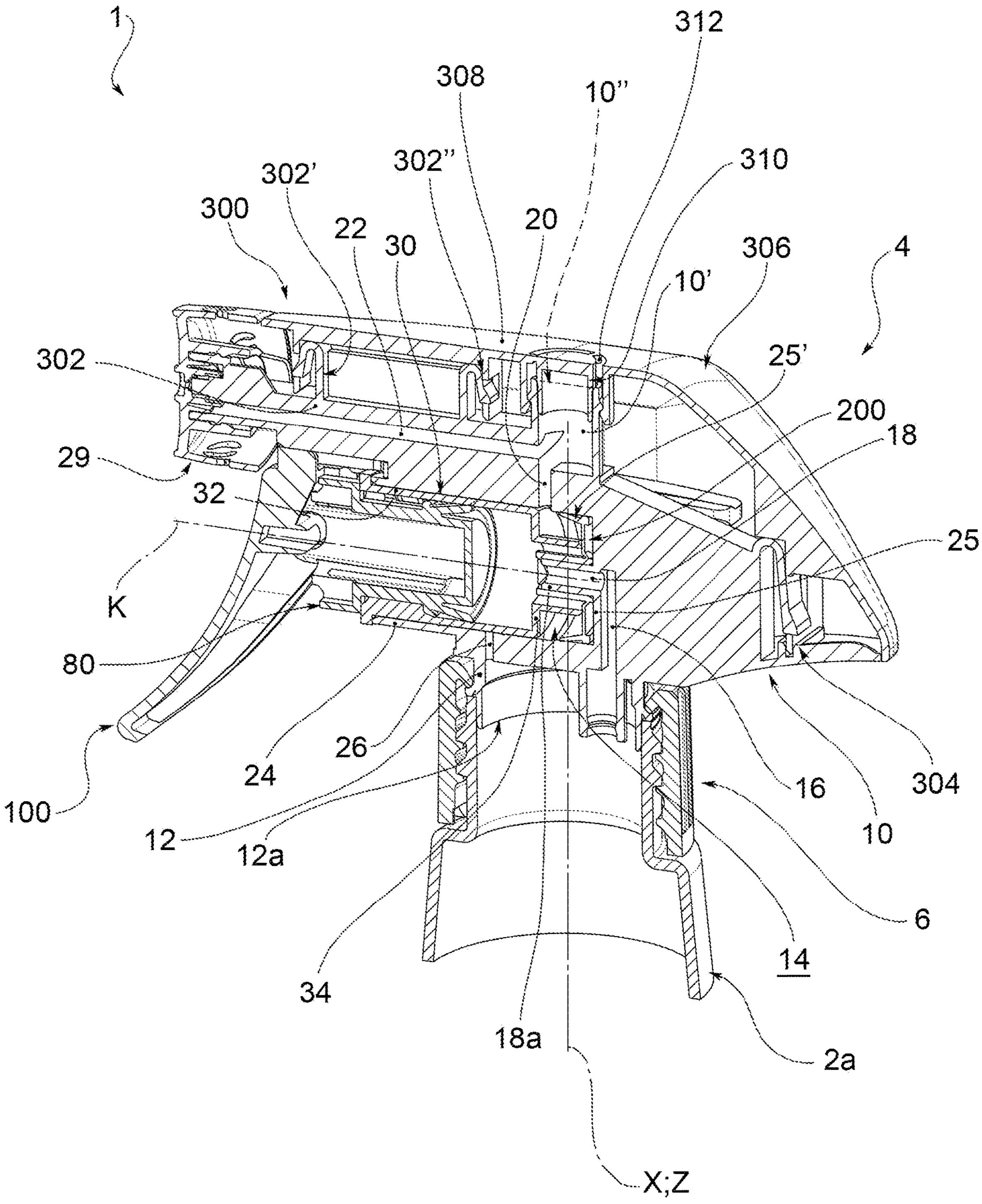
FIG. 2 shows a cross-sectional view of a trigger dispensing head according to an embodiment of this invention.

With reference to the attached figures, a trigger dispensing device comprising a bottle 2 for containing a liquid product to be dispensed, and a trigger dispensing head 4 applied to a neck **2*a* of the bottle have been collectively referred to as 1. The neck 2*a*** has a neck axis X.

The head 4 is applicable to the bottle 2 by means of a ferrule system comprising a threaded ferrule 6 which may be screwed to the neck **2*a*** or, according to a variant embodiment, by means of a bayonet system (not shown), preferably equipped with an anti-removal ridge.

The head 4 comprises a frame 10, preferably made in one piece of plastic material, for example by injection molding, adapted to support the components of the head 4.

The frame 10 comprises an attachment portion 12 provided with a main opening **12*a* having an attachment axis Z; when the head 4 is applied to the neck 2*a*, the main opening 12*a* is in communication with the compartment inside the neck 2*a***, and the attachment axis Z is coincident with the neck axis X.

The head 4 further comprises a circular cylindrical shaped cylinder chamber 14 having a chamber axis K orthogonal to the attachment axis Z; preferably, the cylinder chamber 14 is formed in the frame 10.

The head 4 further comprises a suction duct that connects the main opening **12*a* with the cylinder chamber 14**.

Preferably, said suction duct comprises a first suction segment 16 which, starting from the main opening **12*a*, extends along a first suction axis W, parallel to and preferably spaced apart from the attachment axis Z, and a second suction segment 18 which flows into the cylinder chamber 14 and extends along a second suction axis Y, parallel to the chamber axis K; for example, the second suction axis Y is coincident with the chamber axis K. The second suction segment 18 is delimited by a suction mouth 18*a***.

Preferably, moreover, the first suction segment 16 and/or the second suction segment 18 are formed in the frame 10.

The head 4 further comprises a dispensing duct that places the cylinder chamber 14 in communication with the external environment.

Preferably, the dispensing duct comprises a first dispensing segment 20 which, starting from the cylinder chamber 14, extends along a first suction axis J orthogonal to the chamber axis K, and a second dispensing segment 22 which opens to the external environment and extends along a second dispensing axis Q parallel to the chamber axis K.

Preferably, moreover, the first dispensing segment 20 and/or the second dispensing segment 22 are formed in the frame 10.

The head 4 further comprises a nozzle 29, applied to the free end of the second dispensing segment 22, preferably rotatable at least between a dispensing position, wherein the second dispensing segment 22 is in communication with the external environment, and a closed position, wherein the fluid communication between the second dispensing segment 22 and the external environment is prevented.

The cylinder chamber 14 is annularly delimited by a cylinder wall 24, having an inner surface 24*b*, and on the bottom by a bottom wall 25, from which the suction mouth 18*a* of the suction duct, and in particular the second suction segment 18, protrudes. Further, a valve compartment 25' is defined between the sleeve 30, the cylinder wall 24, and the bottom wall 25, which will be discussed below.

A main vent passage 26, on the other hand, which connects the main opening 12*a* with the cylinder chamber 14, is formed in the cylinder wall 24. Further, at least one through-slot 28, preferably a pair of slots, having a circumferential pattern is obtained in the cylinder wall 24.

Preferably, the head 4 further comprises a sleeve 30, inserted into the cylinder chamber 14, for example axially rotatable with the chamber axis K and preferably constrained with respect to an axial translation.

For example, the sleeve 30 comprises a cylindrical sleeve wall 32 that defines a head opening 33 of the sleeve 30, delimited by a sleeve edge 33*a*; the sleeve wall 32 further has an outer surface 32*a* and an inner surface 32*b*. The sleeve 30 further comprises a bottom wall 34 orthogonal to the chamber axis K and an annular end wall 36 defining a bottom opening 38 of the sleeve 30.

Preferably, the annular end wall 36 is radially lowered with respect of the sleeve wall 32. Preferably, the end wall 36 has a smaller diameter than the sleeve wall 32.

Preferably, the valve compartment 25' has an annular shape extending radially externally about the end wall 36.

On the outer surface 32*a*, the sleeve 30 has a first sealing region 40, delimited by first sealing ridges, e.g., first circumferential sealing ridges 42*a* and first axial sealing ridges 42*b*, and a second closed sealing region 44, delimited by second sealing ridges, e.g., second circumferential sealing ridges 42*c*.

Preferably, the first circumferential sealing ridges 42*a* and the second circumferential sealing ridges 42*c* form two continuous, axially spaced circumferential sealing beads, while the first axial sealing ridges 42 form two continuous, circumferentially spaced axial sealing beads arranged between said circumferential sealing beads.

According to a variant embodiment (not shown), the axial sealing ridges are arranged on the outer surface of the sleeve, while the circumferential sealing ridges are arranged on the inner surface of the cylinder wall.

The sleeve 30 also has a secondary vent passage 50 passing through the sleeve wall 32, which opens onto the outer surface 32*a* within the first sealing region 40.

The sleeve 30 further comprises at least one pin 51, preferably a pair of pins, projecting from the outer surface 32*a* and suitable to be accommodated in the respective slot 28 of the cylinder chamber 14.

Internally, the sleeve 30 has at least one pocket 60, preferably a pair of pockets, having a predetermined angular extension, open on the head opening 33 of the sleeve 30 so as to be axially accessible. For this purpose, said pocket 60 forms an enlargement 62 on the sleeve edge 33*a* of the head opening 33.

The sleeve 30 further comprises a maneuvering portion 70, for example comprising an element extending radially externally from the sleeve wall 32 proximal to the head opening 33.

The suction duct flows into the sleeve 30 through the bottom opening 38; in particular, the second suction segment 18 opens into the sleeve 30, for example, in the compartment delimited by the end wall 36.

The head 4 further comprises a piston 80, preferably insertable into the sleeve 30 through the head opening 33 and sealingly slidable within said sleeve 30.

Preferably, the piston 80 is made in one piece of plastic material, obtained for example by injection molding.

The preferably hollow piston 80 comprises an annular piston wall 82 extending along a piston axis P between a front end 84 and a rear end 86. The piston 80 further comprises a piston bottom 86 at the front end 84 and at least one circumferential piston seal 88 protruding externally from the piston wall 82. At the rear end 86, the piston 80 has a piston-coupling portion 90 for coupling to a trigger of the head 4, provided, for example, with holes 92.

For example, the piston 80 further comprises at least one abutment 94, preferably a pair of abutments, projecting radially externally from the piston wall 82, preferably in the proximity of the rear end 86.

When the head 4 is assembled, the sleeve 30 is inserted into the cylinder chamber 14 so that the sleeve edge 33*a* remains outside the cylinder chamber 14 and abuts against the edge of the cylinder wall 24; the maneuvering portion 70 also remains outside. The pin 51 of the sleeve 30 is accommodated slidably in the slot 28.

The sealing ridges 42*a*, 42*b*, 42*c* on the outer surface 32*a* of the sleeve 30 form a seal with the inner surface 24*b* of the cylinder wall 24.

The piston 80 is in turn inserted within the sleeve 30; within the sleeve 30, the piston seal 88 delimits a pressure chamber 30*a*, on the side where the suction duct opens.

According to a variant embodiment (not shown), the piston is sealingly slidable in the cylinder chamber, so that the piston seal is in sealed contact and slidable on the inner surface of the piston chamber.

The head 4 further comprises a trigger 100, comprising a lever actuation portion 102 suitable for positioning the user's fingers for actuating the head 4, and a trigger engagement portion 104 for connecting with the piston 80. For example, the trigger 100 is hinged to the piston 80, such as by engagement of the trigger engagement portion 104 with the piston engagement portion 90 of the piston 80.

The head 4 further comprises elastic return means suitable for permanently acting on the piston 80, either directly or indirectly, to bring it toward an initial position which will be discussed hereinafter. For example, said return means comprise at least one flexible element 110, preferably a pair of flexible elements, made in one piece with the actuation portion 102 of the trigger 100.

The head 4 further comprises valve means suitable for regulating the flow of product from the suction duct to the pressure chamber 30*a* and from the pressure chamber 30*a* to the dispensing duct. Said valve means are preferably accommodated in the valve compartment 25'.

Said valve means comprise an at least partially flexible valve element 200 made in one piece, for example, by injection molding.

The valve element 200 comprises a tubular portion 202 comprising an annular valve wall 204 extending along a valve axis V, between a rear end 206 defining a rear opening 208, and a front end 210 defining a front opening 209.

The valve element 200 further comprises a flexible flap 212 connected in a cantilevered manner to the front end 210 of the valve wall 204, projecting radially internally.

The flap 212 has, from the side facing the rear opening 208, a shutter portion 214, for example flat or hemispherical or truncated-cone shape.

The valve element 200 further comprises an annular membrane 216 that extends radially externally from the tubular portion 202. The membrane 216 is, for example, flat or, according to further variants (not shown), concave on the part facing the front end 210 of the tubular portion 202 or convex on the part facing the front end 210 of the tubular portion 202.

Preferably, the membrane 216 extends radially beyond the end wall 36.

The valve element 200 further comprises a support portion 218 composed of an annular support wall 220 that connects to and surrounds the membrane 216.

Preferably, the support wall 220 has a flared shape towards the front end 210 of the tubular portion 202 and, on the part facing the rear end 206, a wavy valve base 222 that forms a support for the valve element.

The valve element 200 is located in the cylinder chamber 14, against the bottom wall 25, against which the valve base 222 is placed; the support wall 220, on the other hand, is in contact with the cylinder wall 24 and creates a seal against product leakage.

The tubular portion 202 is threaded onto the suction duct, and in particular onto the second suction segment 18, and the flap 212 forms a flexible shutter for the suction duct. The suction mouth 18*a* of the suction duct and the flexible flap 212 form suitable suction valve means for allowing product to pass from the suction duct to the pressure chamber 30*a* in a suction phase and preventing product from passing from the pressure chamber 30*a* to the suction duct in a dispensing phase.

The membrane 216 cooperates with the sleeve 30, and in particular closes the bottom opening 38 of the pressure chamber 30*a* and abuts against the end wall 36. The end wall 36 and the membrane 216 form pre-compression valve means suitable to allow product to pass from the pressure chamber 30*a* to the dispensing duct only when the pressure in the pressure chamber 30*a* exceeds a predetermined threshold value. Said pre-compression valves are also suitable for preventing the product from passing from the dispensing duct to the pressure chamber 30*a* during a suction phase.

The valve element 200 cooperating with the suction mouth 18*a* of the suction duct and the end wall 36 of the sleeve thus integrates both the suction valve means and the pre-compression valve means into a single component.

In normal operation of the trigger dispensing device, the head 4 is applied to the bottle 2, so that the suction duct is in communication with the compartment inside the bottle, via the main opening 12*a*.

Figure 3:
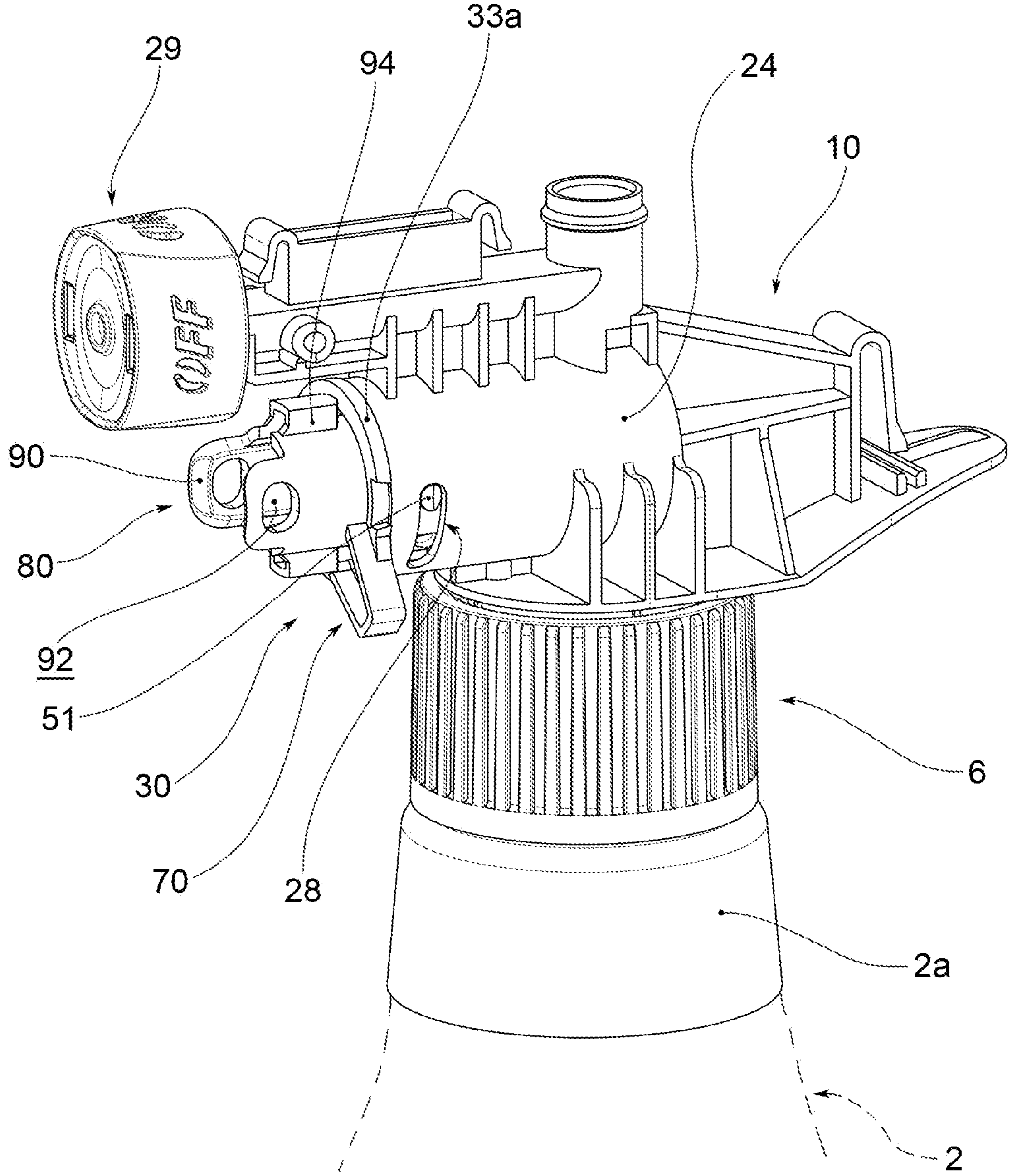
FIG. 3 illustrates an initial locked configuration of the dispensing head.

Preferably, in an initial locked configuration (FIG. 3), the sleeve 30 is in an angular locked position whereby the sleeve edge 33*a* forms an obstacle to the axial translation of the abutment 94 of the piston 80, whereby, while actuating the trigger 100, the piston 80 is prevented from completing a stroke that actuates dispensing. In said initial locked configuration, the maneuvering portion 70 and the pin 51 of the sleeve 30 are in their respective angular locked positions.

Figure 4:
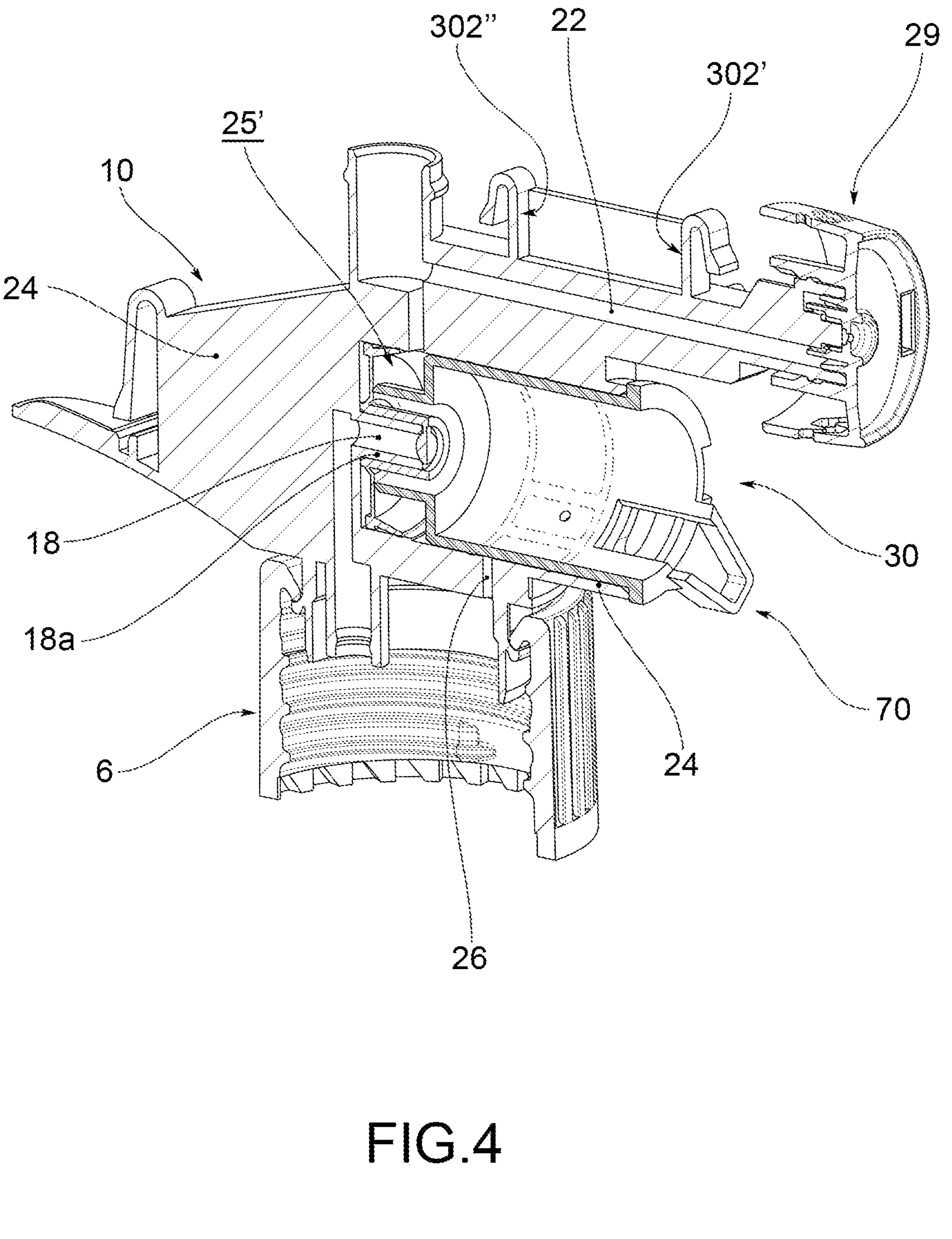
FIG. 4 is a cross-sectional view of FIG. 3.

In said configuration, the main vent passage 26 is sealed from the outside environment, thus preventing the product from escaping to the outside in the event of the device tipping over. In effect, when the sleeve is in the angular locked position, the main vent passage 26 opens into the second sealing region 44 of the outer surface 32*a* of the sleeve 30, which, cooperating with the inner side surface 24*b* of the cylinder wall 24, forms a sealed closed space (FIG. 4).

Figure 5:
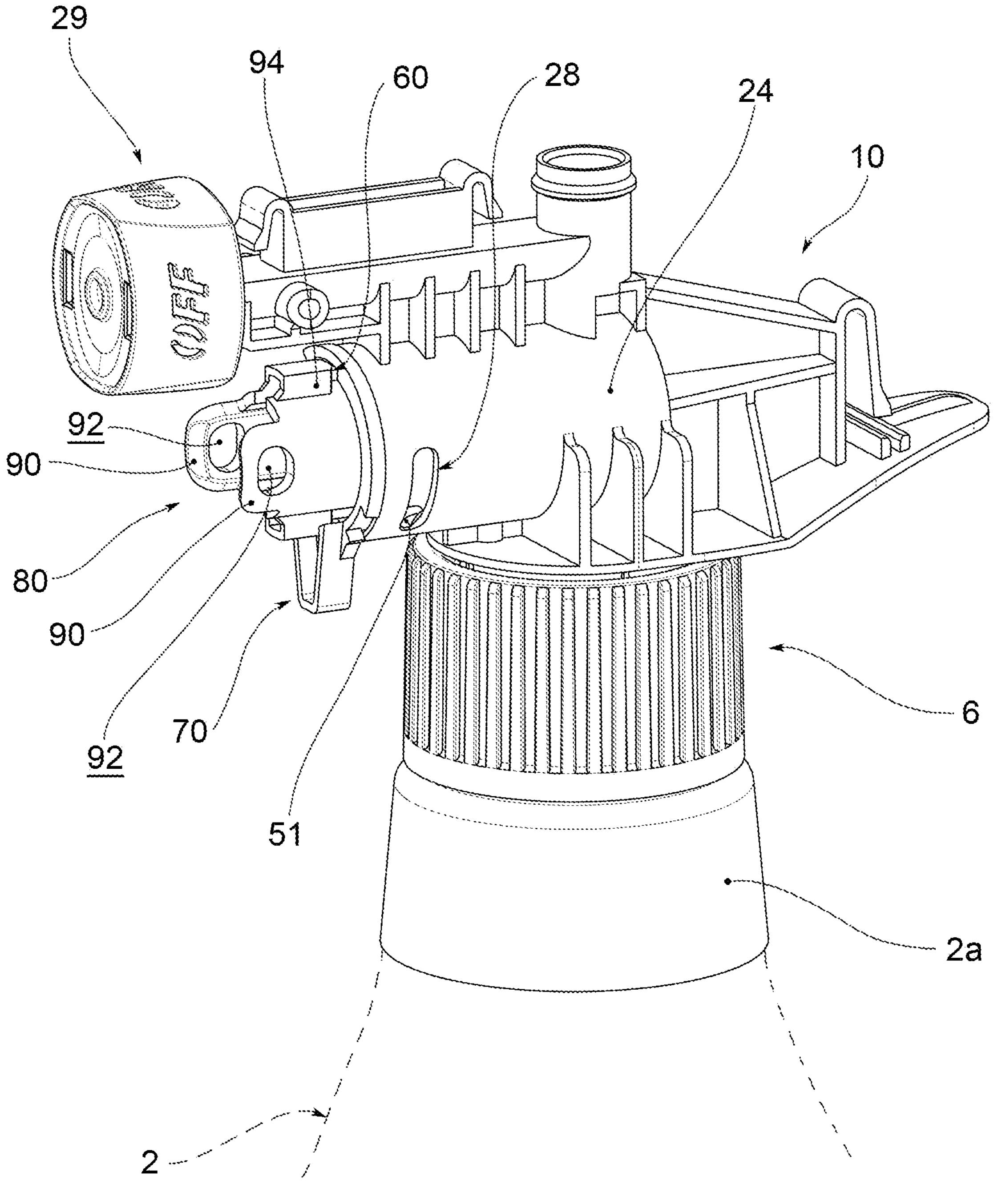
FIG. 5 illustrates an initial released configuration of the dispensing head.

Preferably, by rotating the sleeve 30, for example via the maneuvering portion 70, by, for example, an angle of about 45°, the head 4 reaches an initial release configuration (FIG. 5), wherein the pocket 60 of the sleeve 30 is axially aligned with the abutment 94 of the piston 80, so that, upon actuating the trigger 100, the piston 80 may make an actuation stroke of the head that allows product to be dispensed. In said initial release configuration, the maneuvering portion 70 and the pin 51 of the sleeve 30 are in the respective angular release position.

Figure 6:
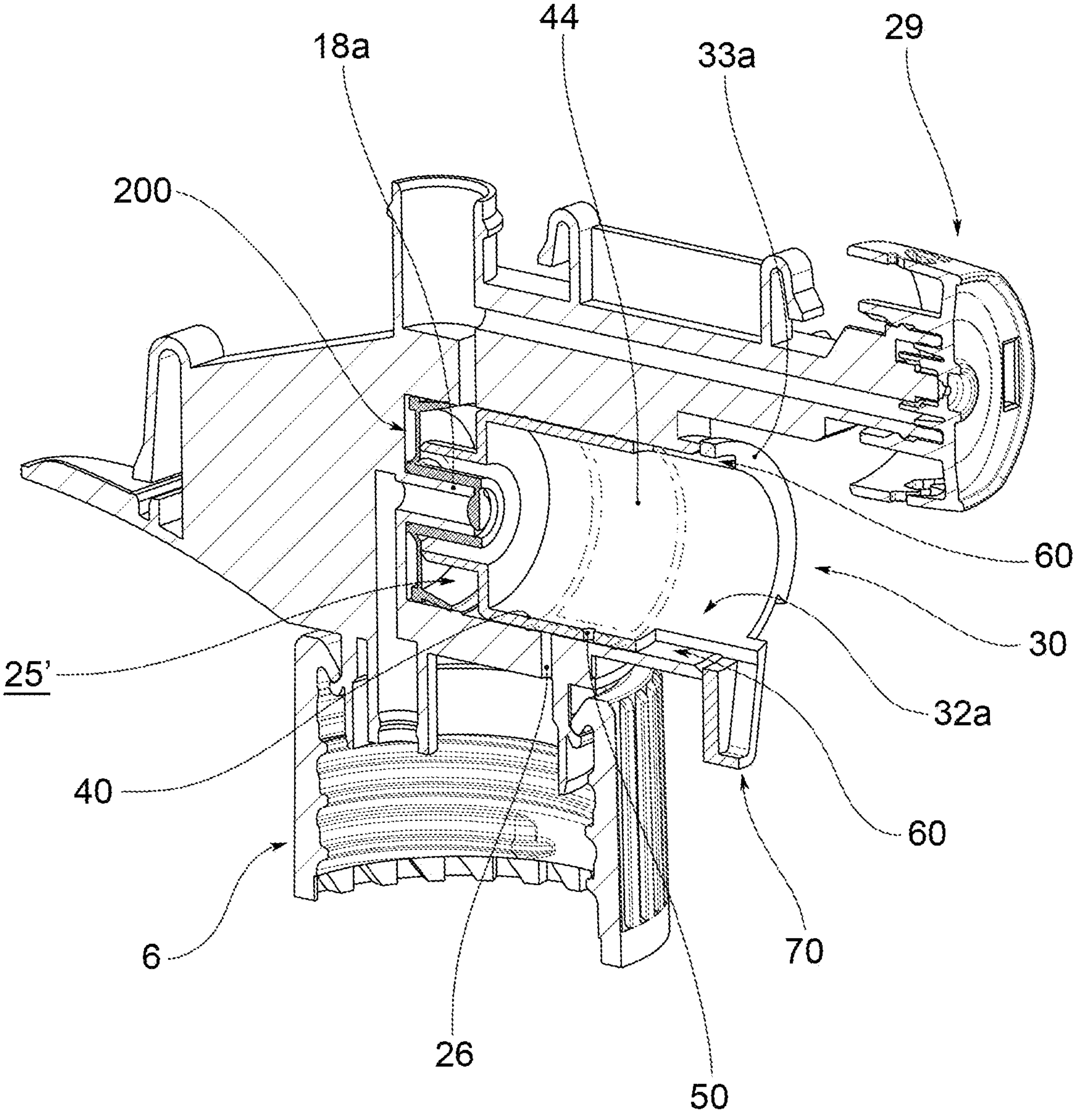
FIG. 6 is a cross-sectional view of FIG. 5.

Further, in said configuration, the main vent passage 26 is open to the external environment, thus allowing air to be drawn in from the outside into the internal compartment of the bottle during the suction phase. In effect, when the sleeve 30 is in the angular release position, the main vent passage 26 flows into the first sealing region 40 of the outer surface 32*a* of the sleeve 30, which, cooperating with the inner side surface 24*b* of the cylinder wall 24, forms a delimited space which, via the secondary vent passage 50, communicates with the inner surface 32*b* of the sleeve 30, which is in communication with the external environment during the suction phase (FIG. 6).

In other words, the sleeve 30 is rotatable by the user between an angular working position, wherein the main vent passage 26 is in fluid communication with the secondary vent passage 50, and an angular rest position, wherein the main vent passage 26 is fluidically separated from the secondary vent passage 50. In particular, in the angular rest position, the main vent passage 26 is fluidically separated from the secondary vent passage 50 by said sealing ridges 42*a*, 42*b*, 42*c*, arranged between the inner surface 24*b* of the cylinder wall 24 and the outer surface 32*a* of the sleeve wall 32.

In the initial release configuration, the trigger 100 and the piston 80 are in a respective initial rest position, and the pre-compression valve means and the suction valve means are in a respective closed configuration.

By actuating the trigger 100, the axial translation of the piston 80 occurs, said piston moving within the sleeve 30 and putting pressure on the product contained in the pressure chamber 30*a*.

Figure 7:
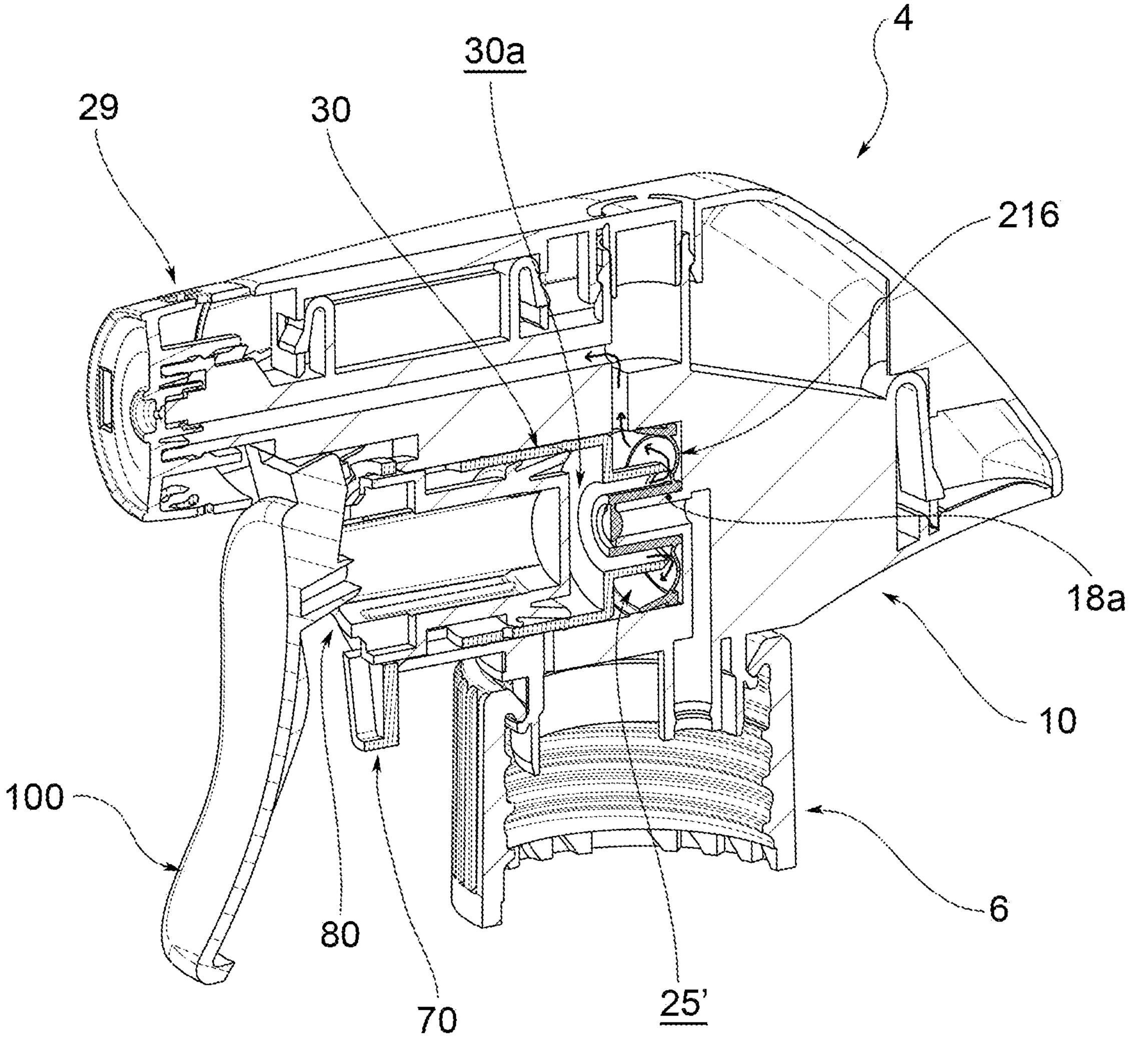
FIG. 7 depicts the dispensing head with pre-compression valve means in an open configuration.

Once a predefined threshold pressure in the pressure chamber 30*a* has been exceeded, the pre-compression valve means pass to an open configuration wherein they allow the product to pass from the pressure chamber 30*a* to the dispensing duct (FIG. 7).

Specifically, the membrane 216 separates from the end wall 36 of the sleeve 30 and allows the product to pass to the dispensing duct, allowing it to be dispensed externally through the nozzle 29 (dispensing phase). The suction valve means remain in the closed configuration.

Figure 8:
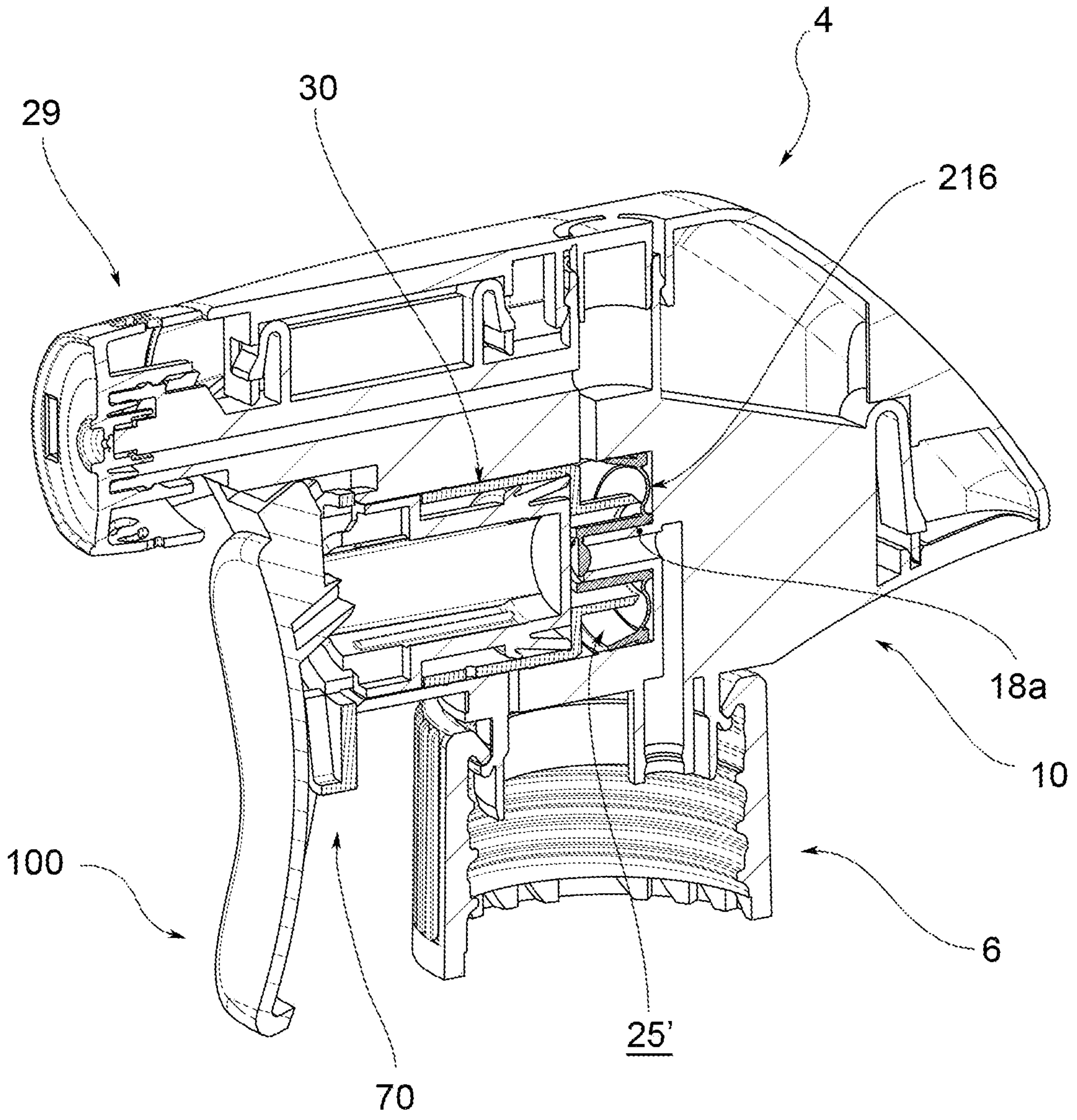
FIG. 8 depicts the dispensing head with the piston in an end position.

Once the trigger 100 and piston 80 are in the end position (FIG. 8) and the dispensing phase is complete, the trigger 100 is released and the elastic return devices operate to return the piston 80 and the trigger 100 to their initial rest position.

Figure 9:
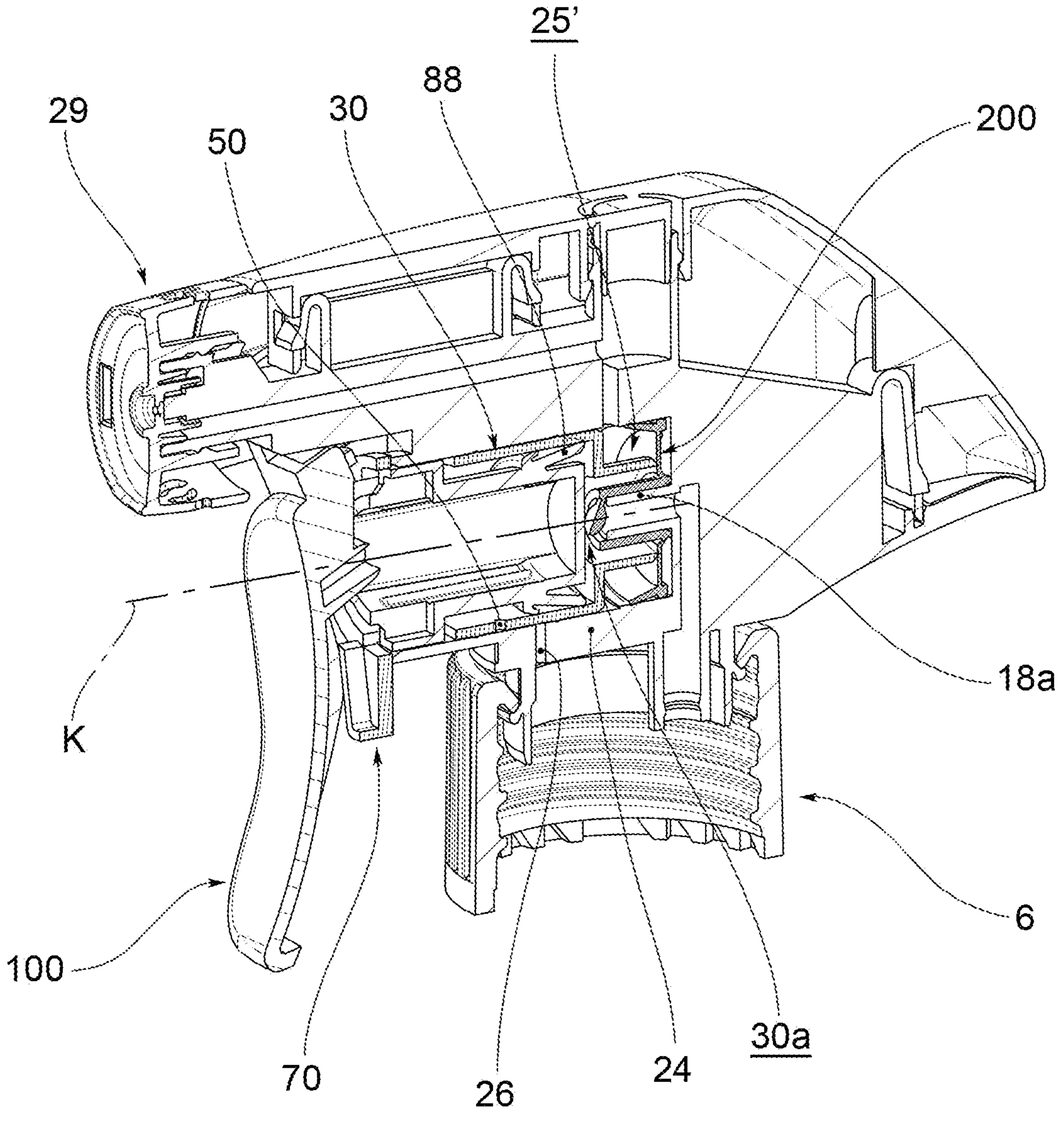
FIG. 9 depicts the dispensing head with suction valve means in an open configuration.
Figure 10:
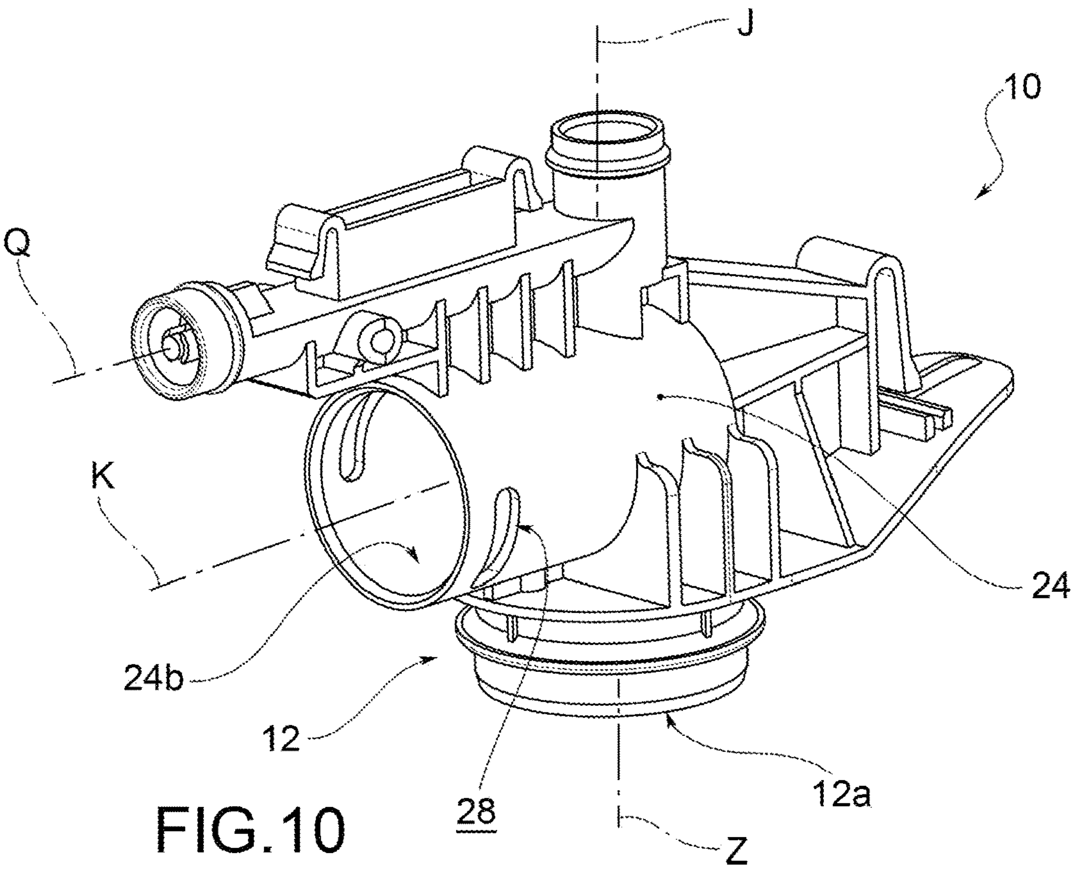
FIG. 10 depicts a frame of the dispensing head.
Figure 11:
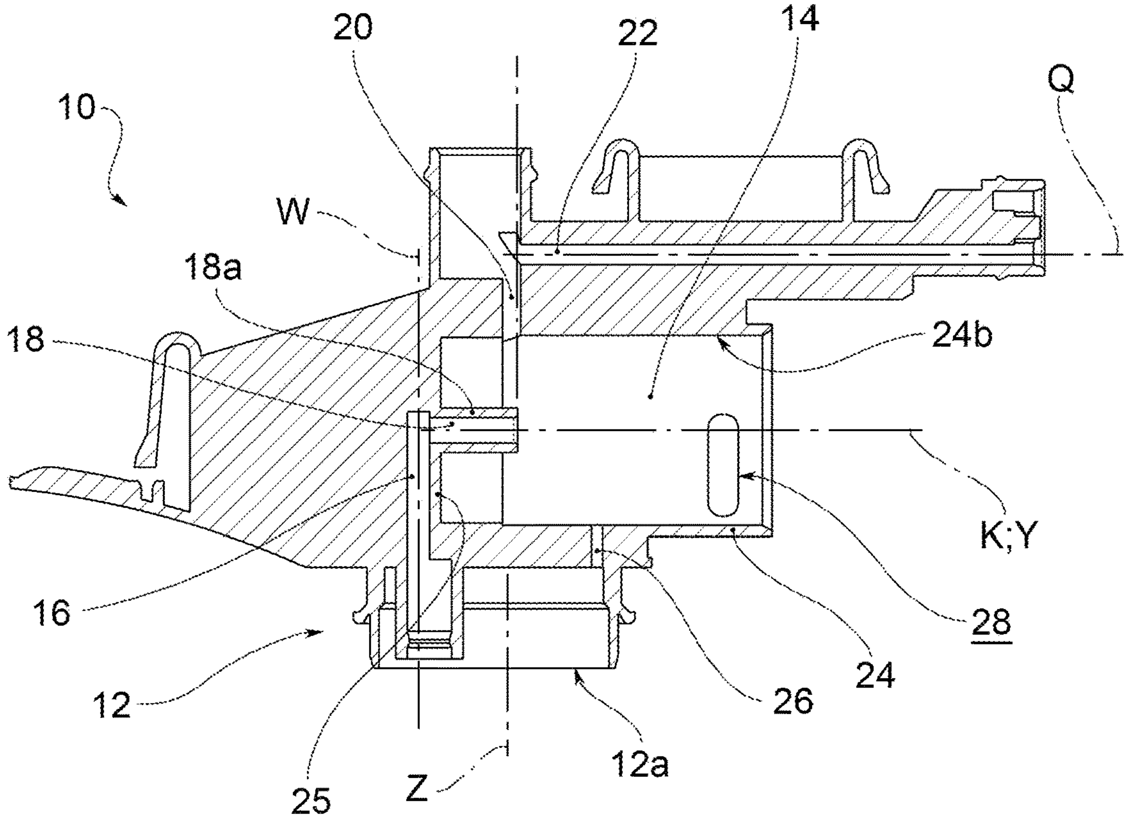
FIG. 11 is a cross-sectional view of the frame in FIG. 10.
Figure 12:
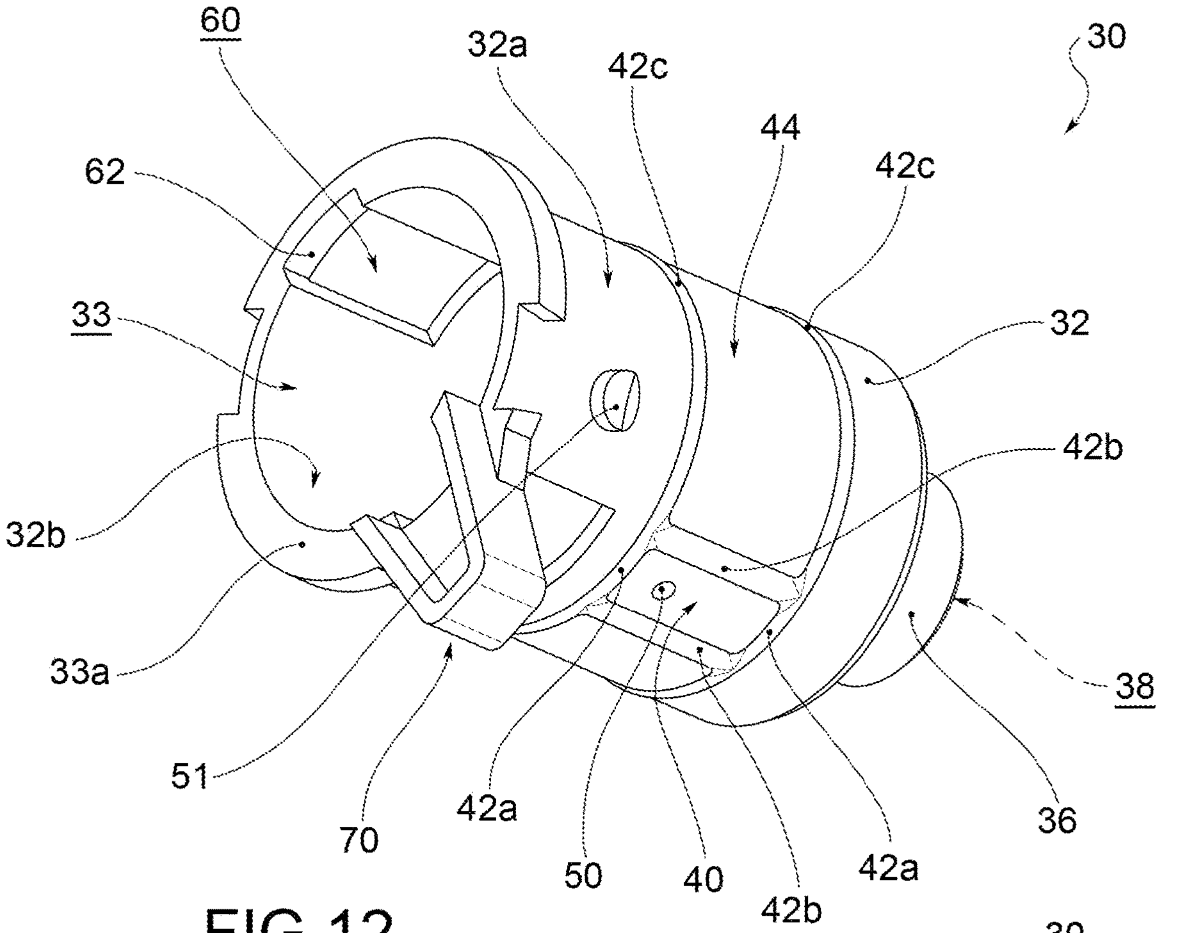
FIG. 12 shows a sleeve of the dispensing head.
Figure 13:
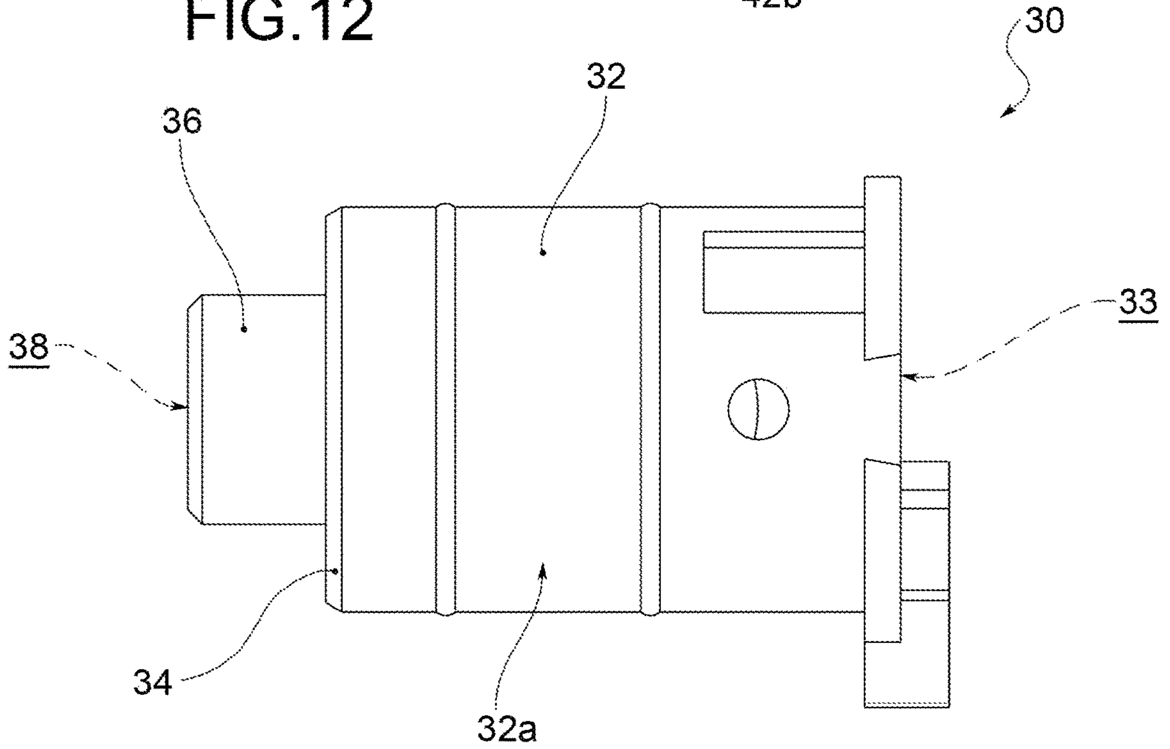
FIG. 13 is a cross-sectional view of the sleeve in FIG. 12.
Figure 14:
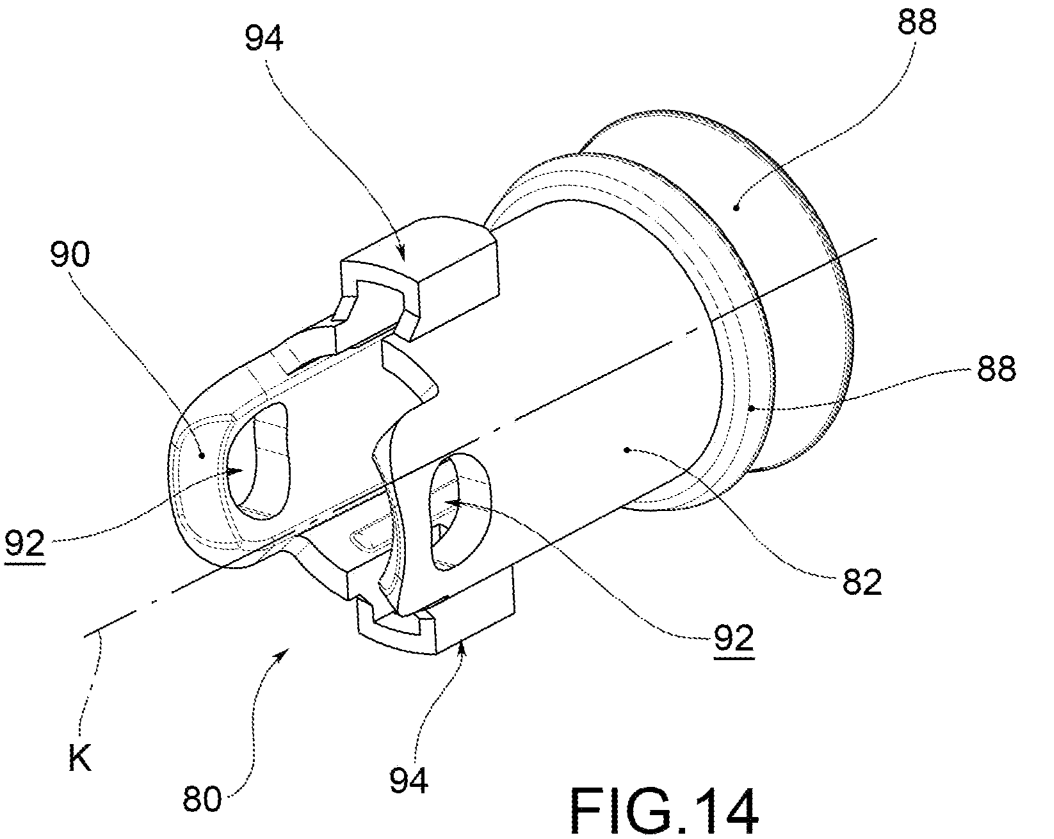
FIG. 14 illustrates a piston of the dispensing head.
Figure 15:
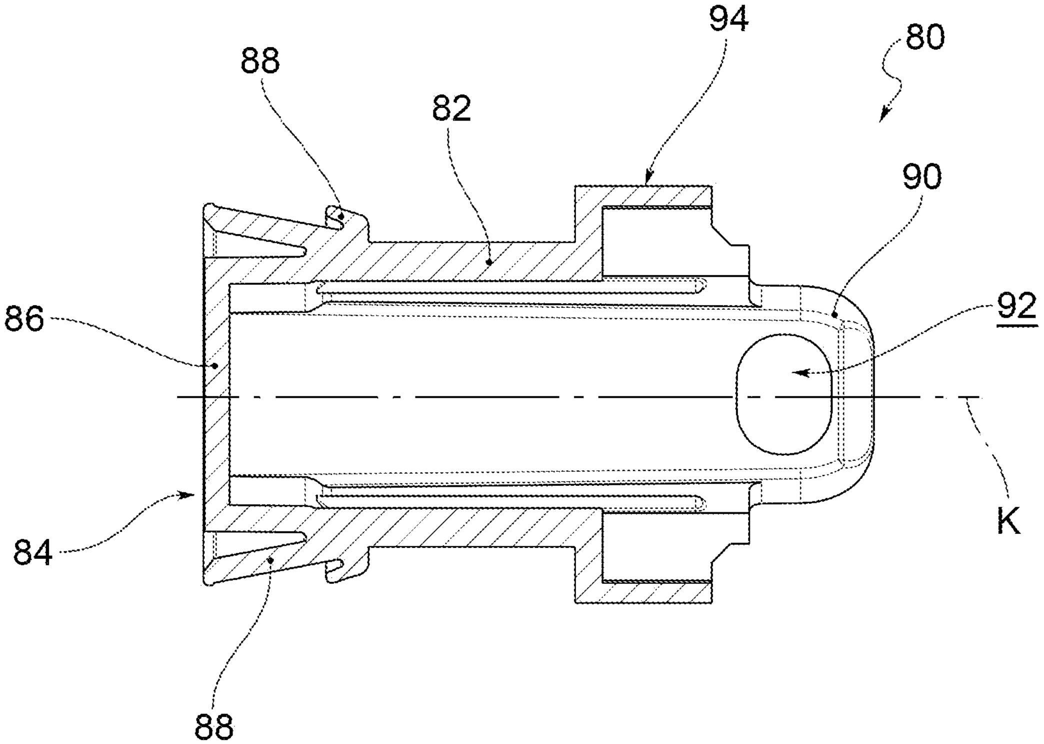
FIG. 15 is a cross-sectional view of the piston in FIG. 14.
Figure 16:
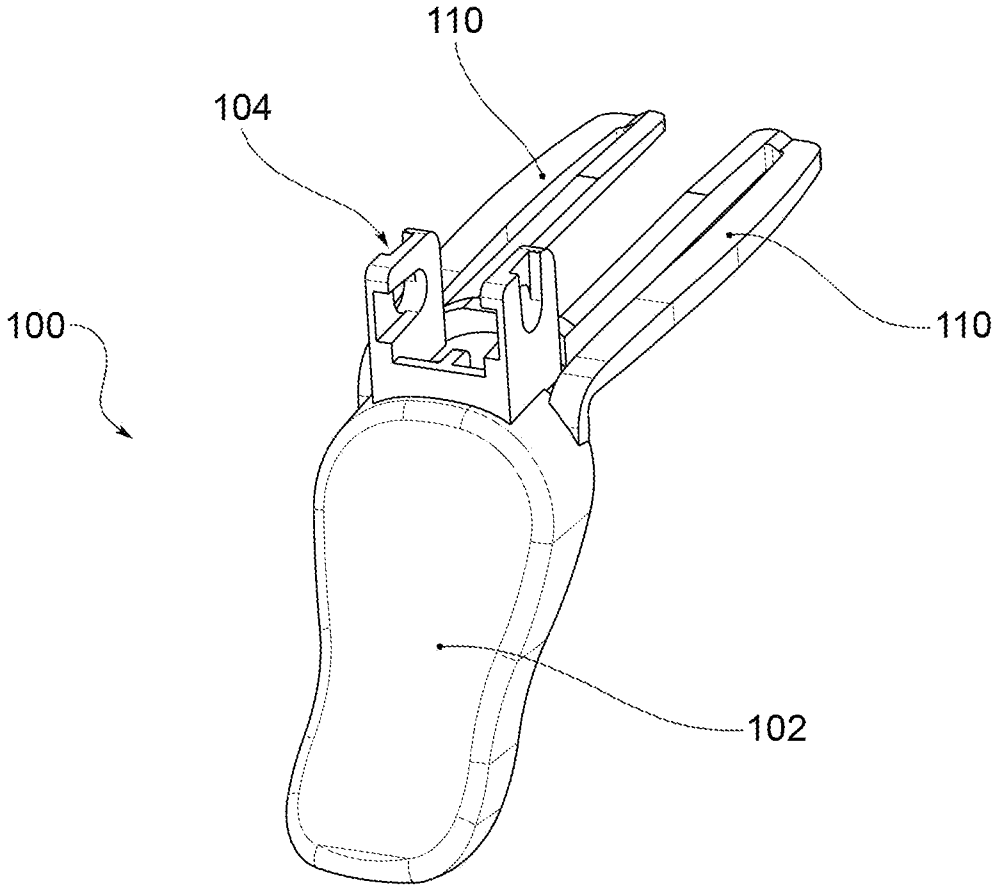
FIG. 16 depicts a trigger of the dispensing head.
Figure 17:
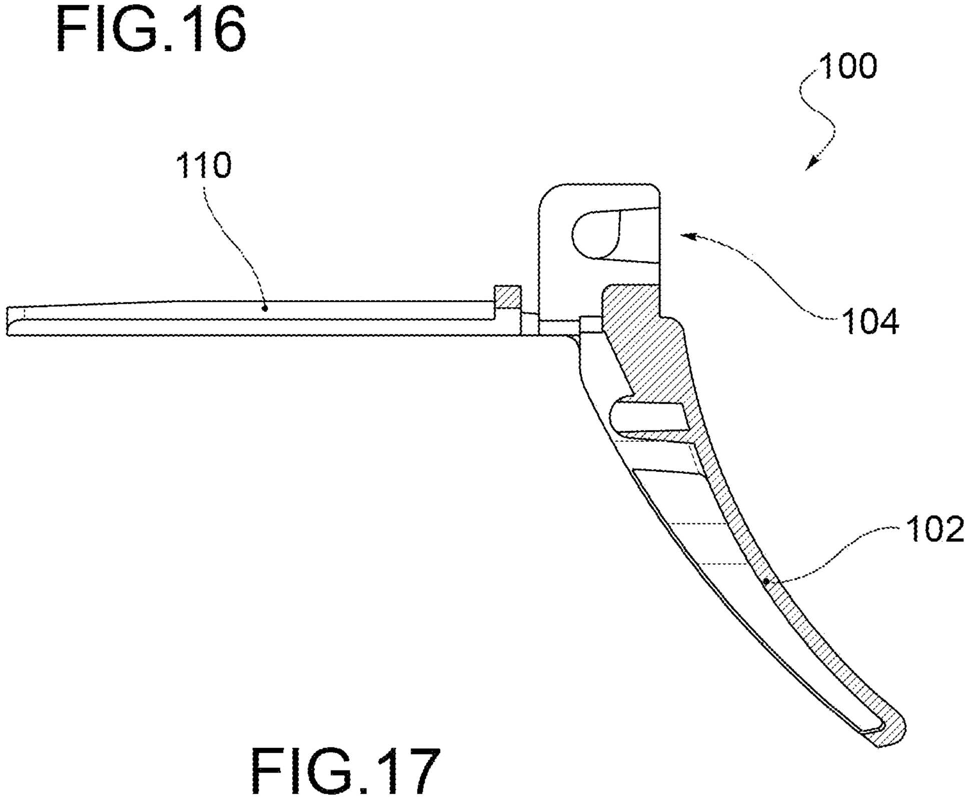
FIG. 17 is a cross-sectional view of the trigger in FIG. 16.
Figure 18:
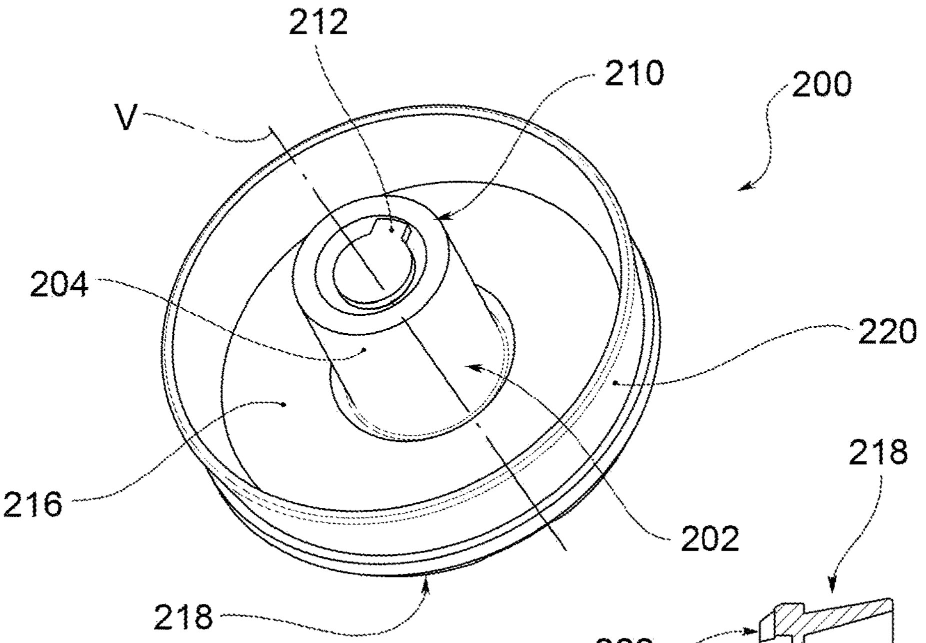
FIG. 18 depicts a valve element of the dispensing head.
Figure 19:
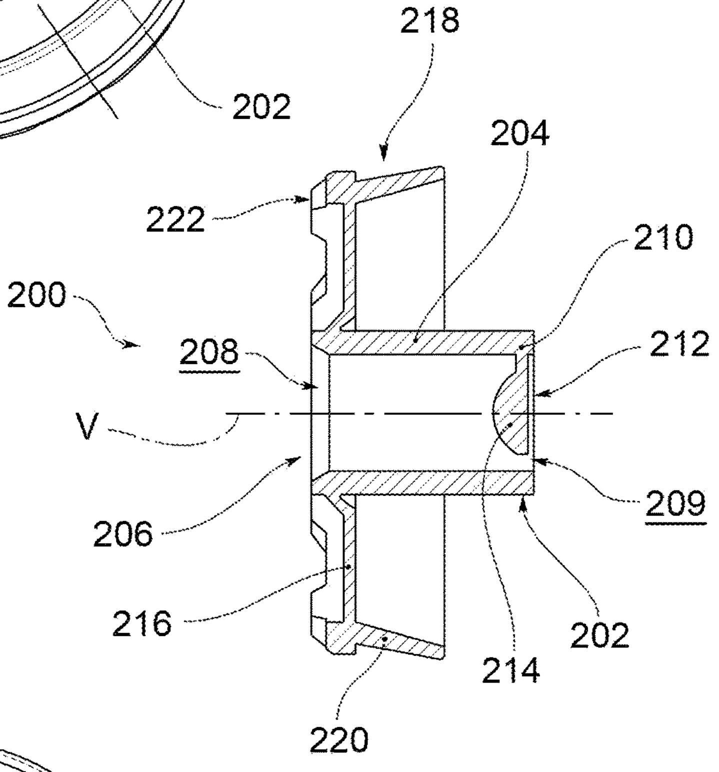
FIG. 19 is a cross-sectional view of the valve element in FIG. 18.
Figure 20:
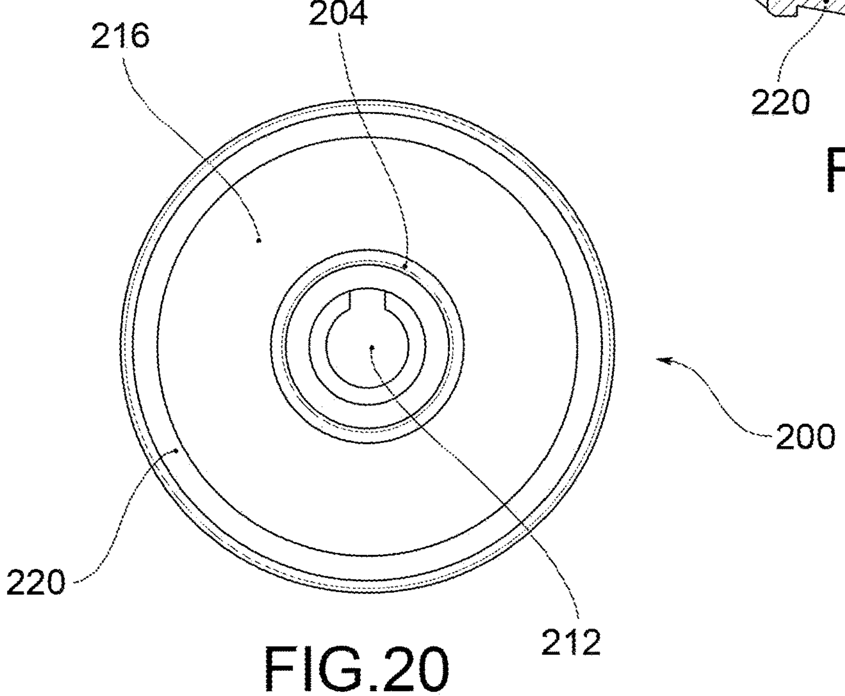
FIG. 20 is a plan view of the valve element in FIG. 18.

The return of the piston 80 to its initial rest position causes a pressure drop in the pressure chamber 30*a*, which causes the suction valve means to move into an open configuration wherein they allow product to be drawn from the suction duct into the pressure chamber 30*a* (FIG. 9).

In particular, the flap 212 flexes and separates from the suction mouth 18*a* of the suction duct, allowing the product to pass from the suction duct into the pressure chamber 30*a* (suction phase).

Further, in the suction phase, the internal compartment of the bottle is in communication with the external environment through the secondary vent passage 50, the first sealing region 40, and the main vent passage 26.

According to a preferred embodiment, moreover, the head 4 comprises a shell 300 attached to the frame 10 to cover it. Preferably, the shell 300 is applied to the frame 10 by at least one snap coupling.

For example, there is provided a first snap coupling 302 arranged in an upper region of the frame 10, such as above the second dispensing segment 22, and a second snap coupling 304, arranged in a lower region of the frame, for example below the bottom wall 25 of the cylinder chamber 14.

For example, the at least one snap coupling comprises a pair of flexible hooks 302', 302" that work in an opposing manner.

Preferably, moreover, an upper surface 306 of the shell 300 comprises a flat region 308. Advantageously, said region allows any weight on the device to be better supported, for example during storage in the warehouse, avoiding the detachment of the shell from the frame.

According to an embodiment, moreover, wherein the first dispensing segment 20 is formed in the frame 10 and extends along the first suction axis J orthogonal to the chamber axis K, the frame 10 also has an extension or inner duct 10' of the first dispensing segment 20 along said first suction axis J.

The extension 10' is itself open to the outside by means of a duct opening 10", in order to allow, during the molding of the frame, the introduction of a core for forming the first dispensing segment 20.

Preferably, the shell 300 comprises a cap 310, protruding internally, suitable for closing off access to the outside of the extension 10'.

Preferably, moreover, the cap 310 is connected to the remaining portion of the shell 300 via a plurality of breakable septa 312. In the event of strong impacts, such as to cause even temporary deformation of the shell 300 or even disassembly, at least some of said septa 312 will encounter breakage, so that the cap 310 is at least partially released from the remaining portion of the shell 300 and remains to close the extension 10'. Advantageously, this prevents product from leaking from the extension 10'.

According to a variant embodiment (not shown), the shell is devoid of the cap, and the head comprises a separate cap, applied to the extension to close it.

According to a further aspect of the invention, the trigger dispensing head 4 comprises a frame 10 for supporting components and a shell 300 applied to the frame 10 for covering said components, wherein said frame 10 has an inner duct 10' opening to the outside via a duct opening 10" and said shell 300 comprises internally a cap 310 made in one piece with the remaining portion of the shell, wherein the cap 310 closes access to the outside of the inner duct 10' and said cap 310 is joined to the remaining part of the shell via at least one breakable septum 312.

Advantageously, this allows for the construction of a trigger dispensing head that may absorb shocks due to less than optimal transport conditions. In effect, if such shocks tend to deform or disassemble the shell, the septa will break and the internal duct will remain closed, avoiding unwanted product spillage.

Innovatively, the above-described dispensing head satisfies the needs of the industry and overcomes the aforementioned drawbacks, in that the valve element integrates suction and pre-compression valve means and, at the same time, facilitates the manufacturing of the component and the assembly of the head.

It is understood that a person skilled in the art, in order to meet contingent needs, could make modifications to the dispensing head described above, all of which are contained within the scope of protection as defined by the following claims.

The invention claimed is:

1. A trigger dispensing head applicable to a bottle of a trigger dispensing device for dispensing a product, the trigger dispensing head comprising:

- a cylinder chamber annularly delimited by a cylinder wall having an inner surface, and by a bottom wall at the bottom;
- a piston that is manually operable to translate along an axial direction;
- a pressure chamber onto which the piston operates;
- a sleeve at least partially accommodated in the cylinder chamber, comprising an annular end wall defining a bottom opening of the sleeve, wherein the sleeve, the cylinder wall, and the bottom wall define a valve compartment;
- a suction duct adapted to put an inner compartment of the bottle in communication with the pressure chamber, comprising a suction mouth projecting axially from the bottom wall;
- a dispensing duct adapted to put the pressure chamber in communication with an external environment; and
- valve means for adjusting a flow of the product from the suction duct to the pressure chamber during a suction step and from the pressure chamber to the dispensing duct during a dispensing step, the valve means comprising a valve element in one piece, the valve element extending through the bottom opening of the sleeve and housed in the valve compartment, the valve element comprising:
  - a tubular portion consisting of an annular valve wall extending along a valve axis, between a rear end defining a rear opening and a front end defining a front opening, said annular valve wall being fitted on the suction mouth;
  - a flexible flap connected in a cantilevered manner to the front end of the annular valve wall, radially projecting internally, provided, on a side facing the rear opening, with a shutter portion adapted to create a seal with the suction mouth for forming suction valve means; and
  - an annular membrane extending radially outwardly from the rear end of the annular valve wall, wherein a front-facing surface of the annular membrane abuts against a terminal end of the annular end wall of the sleeve to form a seal between the annular membrane and annular end wall of the sleeve and close the bottom opening for forming pre-compression valve means.

2. The trigger dispensing head of claim 1, wherein the suction mouth is accommodated in a compartment delimited by the annular end wall.

3. The trigger dispensing head of claim 1, wherein the shutter portion has a flat, hemispherical, spherical dome or truncated-cone shape.

4. The trigger dispensing head of claim 1, wherein, in a rest configuration, the annular membrane is flat or concave on a side facing the front end or convex on the side facing the front end.

5. The trigger dispensing head of claim 1, wherein the valve element is a monolithic valve element further comprising a support portion consisting of an annular support wall connected to the annular membrane and surrounding the annular membrane, the annular support wall being externally in contact with the cylinder wall and creating therewith a seal against outflow of the product.

6. The trigger dispensing head of claim 5, wherein the annular support wall has a flared shape towards the front end.

7. The trigger dispensing head of claim 5, wherein the annular support wall comprises a valve base that forms a support for the valve element.

8. The trigger dispensing head of claim 1, wherein the piston is slidable inside the sleeve and forms therewith the pressure chamber.

9. The trigger dispensing head of claim 1, wherein the annular membrane extends radially outwardly beyond the annular end wall the of the sleeve when the valve element is housed in the valve compartment.

10. The trigger dispensing head of claim 1, wherein the valve element is a monolithic valve element.

* * * * *